(12) United States Patent
Usami (10) Patent No.: US 12,067,078 B2
(45) Date of Patent: Aug. 20, 2024

(54) EDGE DEVICE, STORAGE MEDIUM, AND METHOD OF CONTROLLING EDGE DEVICE

(71) Applicant: CANON KABUSHIKI KAISHA, Tokyo (JP)

(72) Inventor: Kenta Usami, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 371 days.

(21) Appl. No.: 17/533,774

(22) Filed: Nov. 23, 2021

(65) Prior Publication Data

US 2022/0180118 A1 Jun. 9, 2022

(30) Foreign Application Priority Data

Dec. 8, 2020 (JP) ................................ 2020-203294

(51) Int. Cl.
*G06V 10/00* (2022.01)
*G06F 18/21* (2023.01)
*G06N 3/08* (2023.01)

(52) U.S. Cl.
CPC ............... *G06F 18/21* (2023.01); *G06N 3/08* (2013.01)

(58) Field of Classification Search
CPC ............ G06N 3/08; G06N 3/02; G06N 3/045; G06N 3/092; G06N 3/0475; G06N 3/042; G06N 20/00; G06F 18/21; G06T 2207/20081; G06T 2207/20084
See application file for complete search history.

(56) References Cited

U.S. PATENT DOCUMENTS

| | | | | |
|---|---|---|---|---|
| 10,909,676 | B2 * | 2/2021 | Passerini | ............... G06T 7/0012 |
| 11,032,022 | B1 * | 6/2021 | Sen | ........................ G06N 20/20 |
| 11,057,495 | B2 * | 7/2021 | Fedorov | ............... H04L 41/5054 |
| 11,321,132 | B2 * | 5/2022 | Choi | ........................ G06F 9/546 |
| 11,418,582 | B1 * | 8/2022 | Swain | ................... H04L 67/145 |
| 11,568,251 | B1 * | 1/2023 | Palkar | ....................... G06F 17/18 |
| 11,606,392 | B2 * | 3/2023 | Biswas | ............... G06F 9/45558 |
| 11,727,589 | B2 * | 8/2023 | Guizilini | .............. G06N 3/0895 |
| | | | | 382/106 |
| 11,777,796 | B2 * | 10/2023 | Baturin | ............... H04L 63/0478 |
| | | | | 711/154 |
| 2019/0349426 | A1 * | 11/2019 | Smith | ................... H04L 67/104 |
| 2020/0342258 | A1 | 10/2020 | Uno | ................... G06K 9/00973 |
| 2022/0180118 | A1 * | 6/2022 | Usami | ..................... G06F 18/21 |
| 2022/0256647 | A1 * | 8/2022 | Salmasi | ................. H04L 67/04 |

FOREIGN PATENT DOCUMENTS

JP 2020-181488 11/2020

OTHER PUBLICATIONS

Feng Renguang, "CN110557419A task processing method and device and cloud computing system"; Publication Date: Dec. 10, 2019.*

* cited by examiner

*Primary Examiner* — Amir Alavi
(74) *Attorney, Agent, or Firm* — Venable LLP (57) ABSTRACT

An edge device is capable of requesting a server including a first processing processor dedicated to specific processing to execute predetermined processing, and the edge device includes: a determination unit configured to determine whether the predetermined processing is processable by a second processing processor dedicated to the specific processing included in the edge device; and a control unit configured to cause the second processing processor of the edge device to execute the predetermined processing in a case where it is determined that the predetermined processing is processable.

14 Claims, 6 Drawing Sheets

|  | NUMBER OF CORES | OPERATION CLOCK | INT8 | FP16 | FP32 | FP64 | MEMORY BANDWIDTH |
|---|---|---|---|---|---|---|---|
| GPU 1 | yy[CORE] | yy[MHz] | yy[OPS] | yy[FLOPS] | yy[FLOPS] | yy[FLOPS] | yy[GB/s] |
| GPU 2 | zz[CORE] | zz[MHz] | zz[OPS] | zz[FLOPS] | zz[FLOPS] | zz[FLOPS] | zz[GB/s] |

FIG.5B

|  | NUMBER OF CORES | OPERATION CLOCK | INT8 | FP16 | FP32 | FP64 | MEMORY BANDWIDTH |
|---|---|---|---|---|---|---|---|
| PROCESS 1-1 |  |  |  | xx[FLOPS] |  |  |  |
| PROCESS 1-2 |  |  | xx[OPS] |  |  |  |  |
| PROCESS 1-3 |  | xx[MHz] |  |  |  |  |  |
| PROCESS 2-1 | xx[CORE] |  |  |  |  |  |  |
| PROCESS 2-2 |  |  |  |  | xx[FLOPS] |  | xx[GB/s] |

EDGE DEVICE, STORAGE MEDIUM, AND METHOD OF CONTROLLING EDGE DEVICE

BACKGROUND OF THE INVENTION

Field of the Invention

The present invention relates to a technique of determining a device to execute processing in accordance with the performance of a processing processor.

Description of the Related Art

An operation has been performed in which an edge device transfers data transfer to a cloud server through the Internet and the cloud server executes processing using the transferred data. Heretofore, in some cases, an edge device has not been equipped with a graphics processing unit (GPU), which is a processing processor dedicated to parallel processing, or has been equipped with a GPU having insufficient performance. For these reasons, instead of an edge device, a cloud server has performed processing of executing parallel processing at high speed through the Internet. Japanese Patent Laid-Open No. 2020-181488 (hereinafter, referred to as Literature 1) proposes a technique for a cloud server to appropriately allocate processors for inference to be used to process images inputted from an edge device based on an inference time required for each processing or a frequency of use of each processor.

However, in Literature 1, processing using the GPUs requires a large communication load because all the data is transmitted from the edge device to the cloud server. Additionally, in a case where processing from multiple edge devices is concentrated into a cloud server, the performance of the cloud server may decrease because it is difficult to allocate the GPUs.

SUMMARY OF THE INVENTION

An edge device according to an aspect of the present invention is an edge device capable of requesting a server including a first processing processor dedicated to specific processing to execute predetermined processing, including: a determination unit configured to determine whether the predetermined processing is processable by a second processing processor dedicated to the specific processing included in the edge device; and a control unit configured to cause the second processing processor of the edge device to execute the predetermined processing in a case where it is determined that the predetermined processing is processable.

Further features of the present invention will become apparent from the following description of exemplary embodiments with reference to the attached drawings.

DESCRIPTION OF THE EMBODIMENTS

A preferred embodiment of the present invention is described below in detail with reference to the appended drawings. The following embodiment is not intended to limit the present invention according to the scope of claim for patent, and all the combinations of characteristics described in this embodiment are not necessarily essential for means for solving the problems of the present invention.

Embodiment 1

Figure 1:
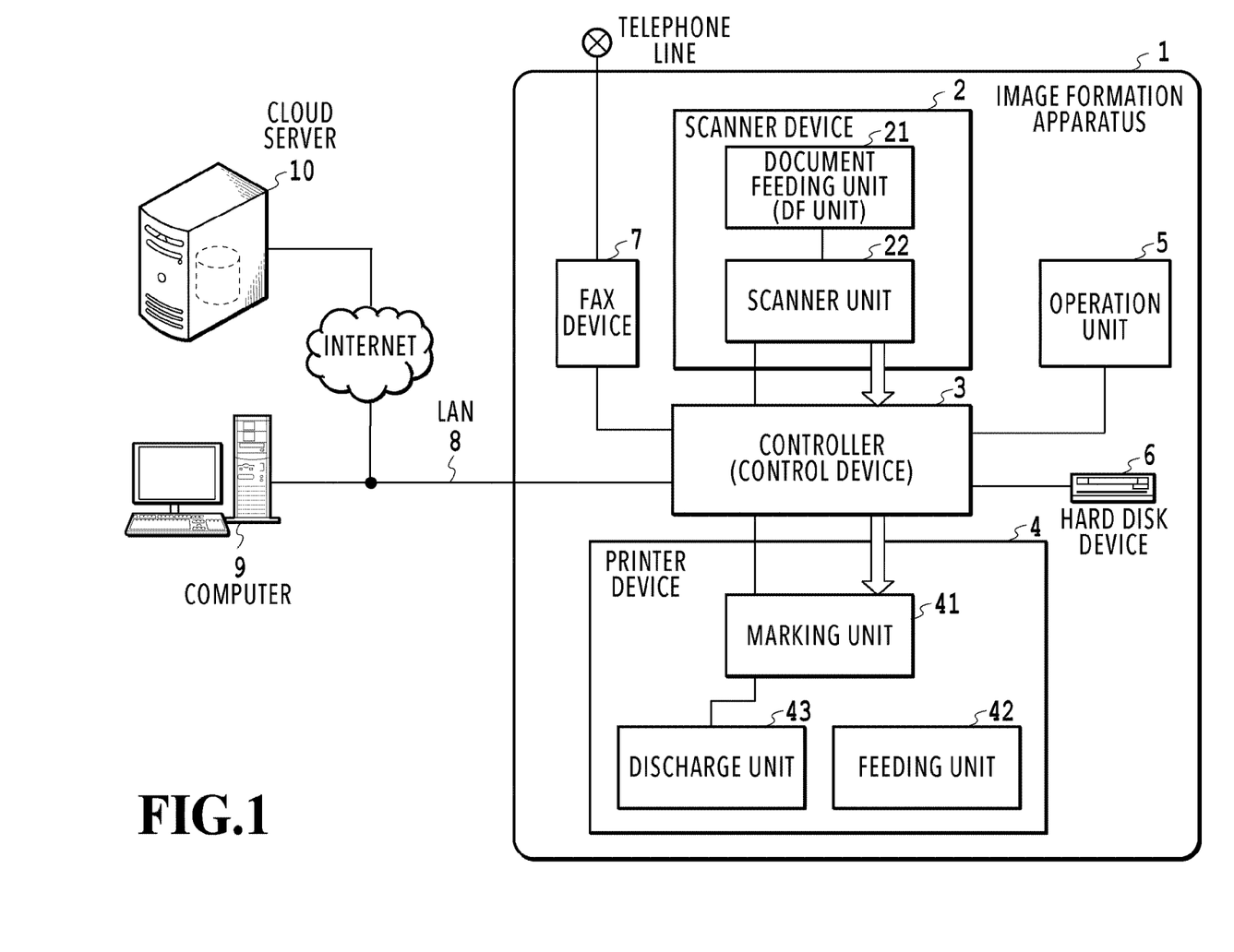
FIG. 1 is a system block diagram of GPU allocation.

FIG. 1 is a block diagram of a system in this embodiment. The system includes an image formation apparatus 1 as an edge device, a computer 9, and a cloud server 10. The image formation apparatus 1 and the computer 9 are connected to the Internet through a LAN 8. The image formation apparatus 1 and the computer 9 communicate with the cloud server 10 through the Internet. The image formation apparatus 1 executes a job in response to reception of input of a digital image outputted, an issuance of the job, or designation of a device, and the like from the computer 9 through the LAN 8. In this embodiment, an image formation apparatus is an edge device; however, the edge device is not limited thereto, and any apparatus can be employed as long as the apparatus requests a cloud server to execute processing.

The cloud server 10 has a role as a storage to save data and use the saved data, and the cloud server 10 is capable of executing learning or inference of image recognition and character recognition using a computational resource by receiving a request from the image formation apparatus 1.

The image formation apparatus 1 includes a scanner device 2, a controller (control device) 3, a printer device 4, an operation unit 5, a hard disk (HDD) device 6, and a FAX device 7. The scanner device 2 includes a document feeding unit 21 capable of automatically and sequentially replacing a batch of documents and a scanner unit 22 capable of performing optical scanning of a document to convert into a digital image, and the thus-converted image data is transmitted to the controller 3. The printer device 4 includes a feeding unit 42 capable of sequentially feeding a batch of paper one by one, a marking unit 41 printing the image data on the thus-fed paper, and a discharge unit 43 discharging the paper after printing, and thus the printer device 4 outputs the digital image to a paper device. A user is able to operate the image formation apparatus 1 by means of the operation unit 5. It is also possible to display information to the user by means of the operation unit 5. The HDD device 6 stores the digital image, a control program, and the like. The FAX device 7 transmits the digital image to a telephone line or the like. The controller 3 is capable of executing a job on the image formation apparatus 1 by providing an instruction to each of the modules described above.

The image formation apparatus 1 is capable of executing various jobs such as a copy function, an image transmission function, an image saving function, and an image printing function. Each of these functions are simply described below. With the copy function, an image read from the scanner device 2 is recorded into the HDD device 6, and the printer device 4 is used concurrently to perform printing. With the image transmission function, an image read from the scanner device 2 is transmitted to the computer 9 and the cloud server 10 through the LAN 8. With the image saving function, an image read from the scanner device 2 is recorded into the HDD device 6, and image transmission and image printing are performed as necessary. With the image printing function, for example, a page description language transmitted from the computer 9 is analyzed and is printed by the printer device 4.

Figure 2:
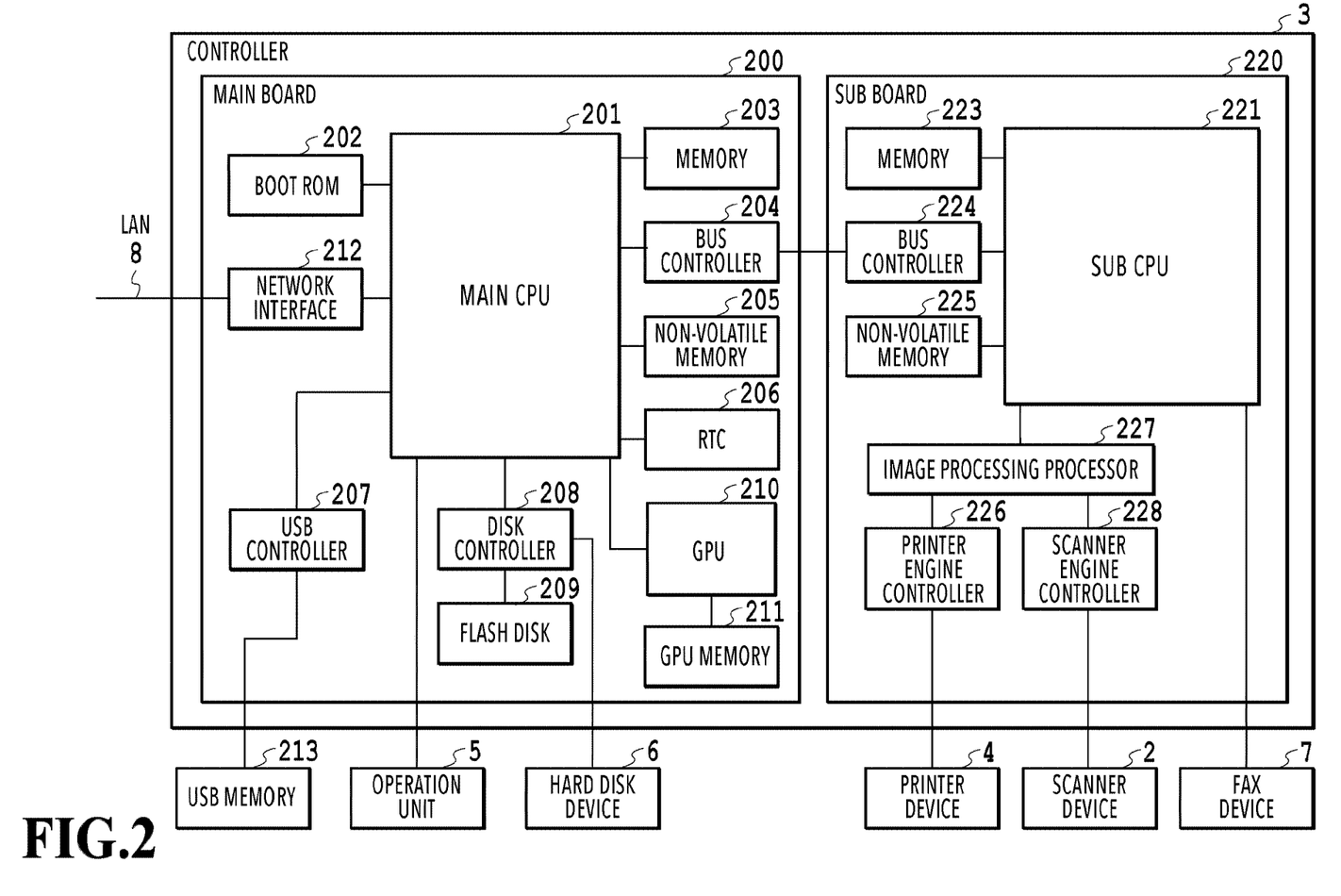
FIG. 2 is a configuration diagram of a controller mounted in an image formation apparatus.

FIG. 2 is a configuration diagram of the controller 3 mounted in the image formation apparatus 1. The controller 3 includes a main board 200 and a sub board 220. The main board 200 is a system of a so-called general-purpose CPU. The main board 200 includes a main CPU 201, a Boot ROM 202, a memory 203, a bus controller 204, a non-volatile memory 205, a real-time clock (RTC) 206, and a universal serial bus (USB) controller 207. In addition, the main board 200 includes a disk controller 208, a flash disk 209, a GPU 210, a GPU memory 211, and a network interface 212. The CPU 201 controls the overall main board. The Boot ROM 202 contains a main Boot program and has a role to activate a device. The memory 203 is used as a working memory by the CPU 201. The bus controller 204 has a function of a bridge to an external bus. The non-volatile memory 205 is a memory that can hold data even in a situation with no power supply. The RTC 206 has a clock function and can keep counting the time even in a situation where a main power of the device is shut off. The USB controller 207 controls transmission and reception of a signal through a USB connector. The disk controller 208 controls a storage device and includes the flash disk (such as an SSD) 209 or the like that is a non-volatile storage device with a relatively small capacity including a semiconductor device.

As described above, the controller 3 includes the GPU 210 and the GPU memory 211 used as a working memory by the GPU 210. In this embodiment, the GPU 210 can execute a part of image processing by cooperating with an image processing processor of the sub board 220 and also can be used in a general-purpose application like a CPU. Consequently, the image formation apparatus 1 can cover the processing executed by the cloud server 10 or can execute a job received from the computer 9 (such as learning or inference of image recognition and character recognition) by cooperating with the cloud server 10. In addition, it is possible to connect a USB memory 213, the operation unit 5, the HDD device 6, and the like from the outside of the main board 200.

The sub board 220 includes a relatively small general-purpose sub CPU system and image processing hardware. Specifically, the sub board 220 includes a sub CPU 221, a memory 223, a bus controller 224, a non-volatile memory 225, a printer engine controller 226, a scanner engine controller 228, and an image processing processor 227. The sub CPU 221 controls the overall board, and the sub CPU 221 uses the memory 223 as a working memory. The bus controller 224 has a function of a bridge to an external bus. The non-volatile memory 225 has a role same as the non-volatile memory 205 included in the main board 200.

Additionally, the sub board 220 includes the image processing processor 227 executing real-time digital image processing, the printer engine controller 226, and the scanner engine controller 228. In this embodiment, the image processing processor 227 is dedicated hardware executing general image processing such as a printer, a scanner, or the like and has a role different from the GPU 210 of the main board 200.

The external scanner device 2 and the external printer device 4 receive and transmit digital image data through the printer engine controller 226 and the scanner engine controller 228, respectively. The FAX device 7 as an external device is directly controlled by the sub CPU 221.

In addition, for example, a CPU like the main CPU 201 and the sub CPU 221 may include many types of CPU peripheral hardware such as a chipset, a bus bridge, and a clock generator; however, the descriptions thereof are condensed.

Next, operations of the controller 3 are described taking image copy by means of a paper device as an example. Once the user instructs image copy from the operation unit 5, the main CPU 201 transmits a command of image reading to the scanner device 2 through the sub CPU 221. The scanner device 2 performs optical scanning of a paper document, and after converting into digital image data, inputs the digital image data to the image processing processor 227 through the scanner engine controller 228. The image processing processor 227 performs direct memory access (DMA) transfer to the memory 223 through the sub CPU 221 to temporarily save the digital image data. Once confirming that a certain amount of or all the digital image data is inputted to the memory 223, the main CPU 201 instructs the printer device 4 through the sub CPU 221 to output the image. The sub CPU 221 notifies the image processing processor 227 of the location of the image data on the memory 223. Also, in accordance with a synchronization signal from the printer device 4, the sub CPU 221 transmits the image data on the memory 223 to the printer device 4 through the image processing processor 227 and the printer engine controller 226. Based on the transmitted data, the printer device 4 prints the digital image data on a paper device. In a case of printing multiple copies, it is possible to cause the main CPU 201 to save the image data on the memory 223 into the HDD device 6 such that it is possible to transmit the image to the printer device 4 without obtaining the image from the scanner device 2 after the first copy.

The GPU 210 can be used for the rendering of a user interface (UI) screen or a part of the real-time digital image processing executed by the image processing processor 227. Unlike the CPU 201, the GPU 210 is not suitable for general-purpose complicated processing, but is suitable for executing a large amount of simple processing executable in parallel. For this reason, the GPU 210 can be used for the learning or the inference of image recognition and character recognition. In this embodiment, the following descriptions are given based on the premise that GPUs are mounted in both of the image formation apparatus 1 and the cloud server 10; however, no GPU may be mounted in the image formation apparatus 1. The processing for the case where no GPU is mounted in the image formation apparatus 1 is also described later.

Figure 3:
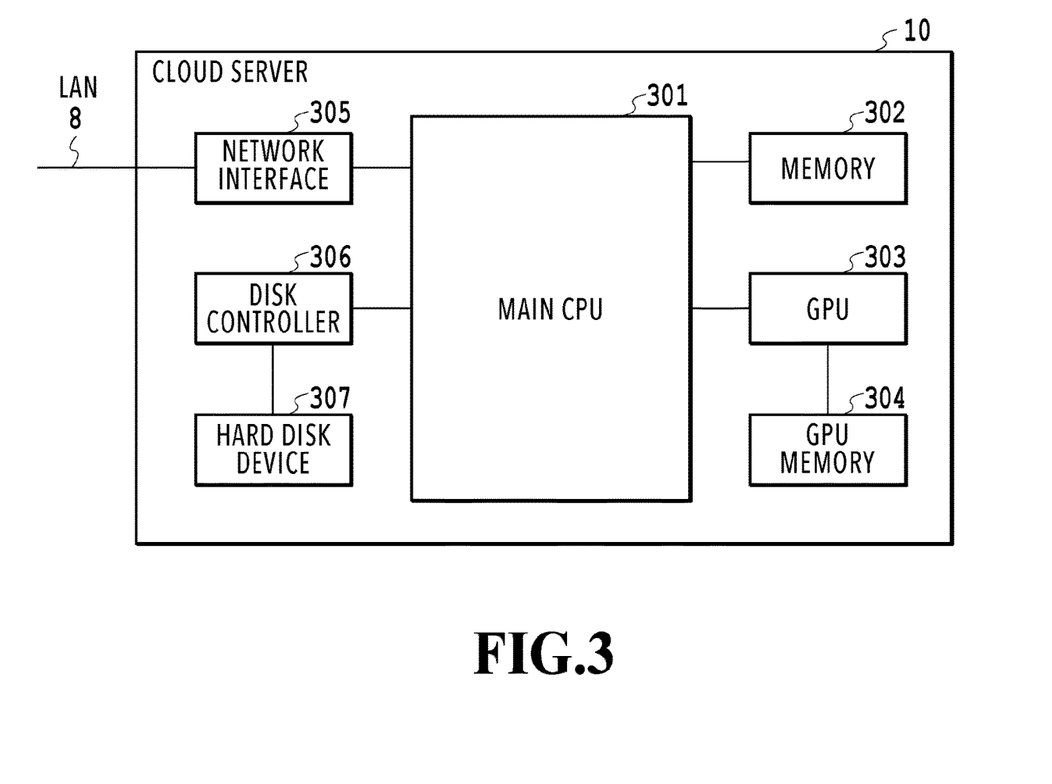
FIG. 3 is a configuration diagram of a cloud server.

FIG. 3 is a block diagram of the cloud server 10. The cloud server 10 includes a CPU 301 executing general-purpose processing, a memory 302 used by the CPU 301 as a working memory, and a GPU 303 used for the machine learning or inference and the like. Additionally, the cloud server 10 includes a GPU memory 304 used as a working memory for the GPU 303. In addition, the cloud server 10 includes a network interface 305 serving as an interface between the cloud server 10 and an external network by means of the LAN 8, a disk controller 306 controlling a storage device, and a hard disk device 307 storing a program, data, and so on. Note that, the GPU 303 included in the cloud server 10 is also referred to as a first processing processor, and the GPU 210 included in the image formation apparatus 1 is also referred to as a second processing processor.

Figure 4:
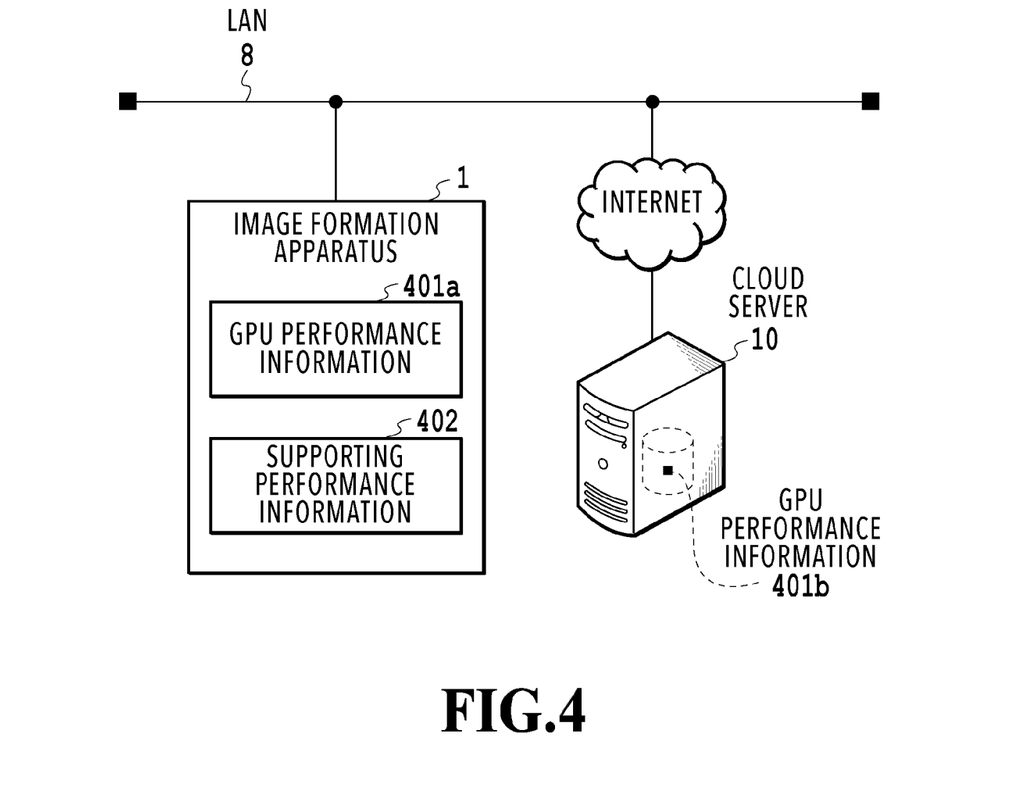
FIG. 4 is a system configuration diagram for describing GPU performance.

FIG. 4 is a system configuration in a case of applying this embodiment. The image formation apparatus 1 holds GPU performance information 401a and supporting performance information 402. The GPU performance information 401a is information indicating the GPU performance of the GPU 210 included in the image formation apparatus 1. The supporting performance information 402 is information in which the processing using the GPU 210 is associated with the GPU performance required for the processing using the GPU 210. The GPU performance information 401a and the supporting performance information 402 may be held in the hard disk device 6 or the non-volatile memory 205 and expanded into the memory 203 to be used by a program.

As with the image formation apparatus 1, the cloud server 10 holds GPU performance information 401b on the GPU 303 included in the cloud server 10 in the hard disk device 307 of the cloud server 10. The image formation apparatus 1 is capable of obtaining the GPU performance information 401b held by the cloud server 10 through the LAN 8 and the Internet to expand it into the memory 203. In a case of executing GPU-using processing, the image formation apparatus 1 checks the GPU performance required for the processing based on the supporting performance information 402 and determines a device that satisfies the GPU performance required for the processing with reference to the GPU performance information 401a and 401b.

Figure 5A:
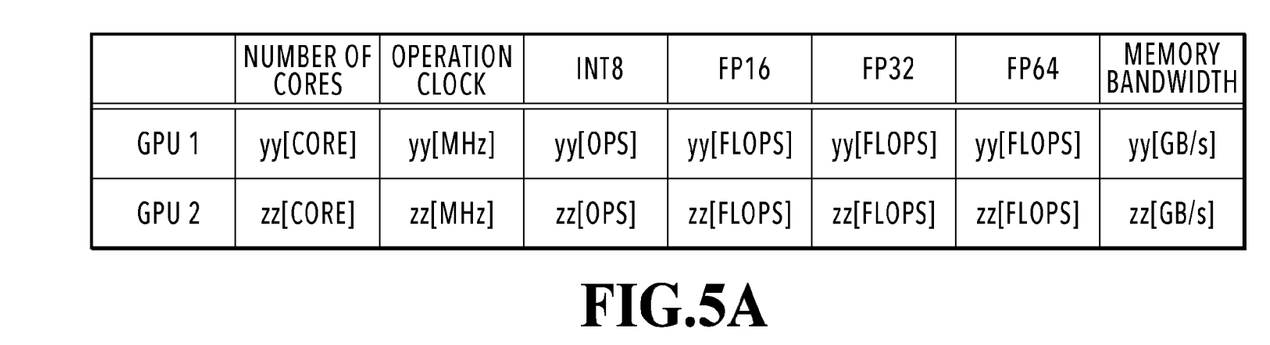
FIGS. 5A and 5B are diagrams describing GPU performance.
Figure 5B:
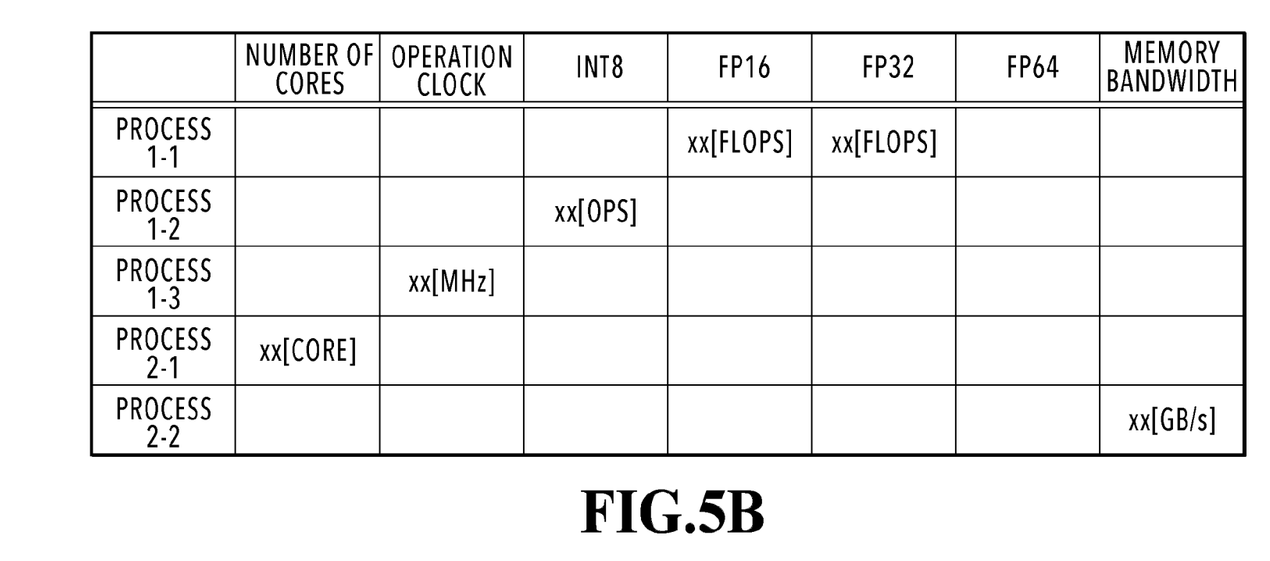

FIGS. 5A and 5B are diagrams describing the GPU performance. FIG. 5A is an example illustrating the GPU performance information 401a and 401b, and FIG. 5B is an example illustrating the supporting performance information 402. As illustrated in FIG. 5A, the image formation apparatus 1 holds both the GPU performance information 401a on the GPU 210 included in the image formation apparatus 1 itself and GPU performance information 401b on the GPU 303 included in the cloud server 10. Note that, the example herein illustrates that the image formation apparatus 1 already holds the GPU performance information 401b by obtaining it from the cloud server 10. In FIG. 5A, "GPU 1" represents the GPU 210 of the image formation apparatus 1, and "GPU 2" represents the GPU 303 of the cloud server 10.

As described above, in some cases, the GPU 210 may not be mounted in the image formation apparatus 1. For instance, if no GPU is mounted in the image formation apparatus 1, FIG. 5A holds only the GPU performance information (GPU 2) on the GPU 303 included in the cloud server 10. In this embodiment, as indexes of the GPU performance, there are the number of cores, the operation clock, INT8, FP16, FP32, FP64, and the memory bandwidth. The number of cores indicates the number of processing that are executable in parallel, and the greater the number of cores, the faster the parallel processing can be executed. The operation clock indicates the speed of processing executed by the GPU main body, and the greater the value, the faster the GPU main body can operate. INT8 is an index for a case of computing with an accuracy of 8-bit integers, which is not used in a case of the learning that requires a high accuracy but allows for high-speed calculation with no problem in a case of the inference after the learning. FP16 is an index for a case of computing with 16-bit floating point, which is hardly used in a case of the learning due to a low accuracy but has a high computing speed in a case of the inference and often used in that case. FP32 is an index for a case of computing with 32-bit floating point, which is often used in a case of the learning but hardly used in a case of the inference because the speed is emphasized in that case. FP64 is an index for a case of computing with 32-bit floating point, which is often used in a place that requires more accuracy in a case of the learning but hardly used in a case of the inference. The memory bandwidth affects the speed of writing and reading to a memory, and broader the width of the memory bandwidth, the higher the speed of data transfer. Note that, the values held in FIG. 5A are values indicating the performances as the original specifications.

As described above, as illustrated in FIG. 5B, the image formation apparatus 1 holds the supporting performance information 402 in which GPU-using processing is associated with the GPU performance required for the GPU-using processing. FIG. 5B illustrates an example in which values are put for cells each corresponding to the performance required for the processing. A blank cell indicates that the corresponding performance is not used for the processing or that the corresponding performance is used but the load on the GPU is small. Examples of the processing using the GPU 210 in the image formation apparatus 1 may include the rendering of a UI screen, the real-time digital image processing, and the learning or inference of image recognition and character recognition. The rendering of a UI screen is processing for an image to be displayed on the operation unit 5. The real-time digital image processing is to execute image processing of image data inputted from the scanner device 2 and image data to be outputted to the printer device 4. The learning of image recognition and character recognition is to perform learning for image recognition and character recognition by using image data inputted to the image formation apparatus 1 and data stored in the hard disk device 6. Since this processing particularly requires accuracy, it is desirable to use a GPU supporting FP32 or FP64. The inference of image recognition and character recognition is to perform the inference for image recognition and character recognition on image data inputted to the image formation apparatus 1 and data stored in the hard disk device 6. Since the speed is particularly important in this processing, it is desirable to use a GPU supporting INT8 or FP16. Additionally, it is possible to subdivide the above-described processing into sub-processes and holds the sub-processes in the supporting performance information 402 as illustrated in FIG. 5B. For example, processing 1 and processing 2 in FIG. 5B are examples of the GPU-using processing as described above. In a case of the processing 1, 1-1, 1-2 and 1-3 denote sub-processes at three stages to which the single processing of the processing 1 is subdivided in accordance with the performance of the GPU to be used. As described above, it is possible to employ a mode in which the processing is subdivided, and only pre-processing is executed by the image formation apparatus 1 and the rest of the processing is performed by the cloud server 10 in accordance with the stages of the processing.

Figure 6:
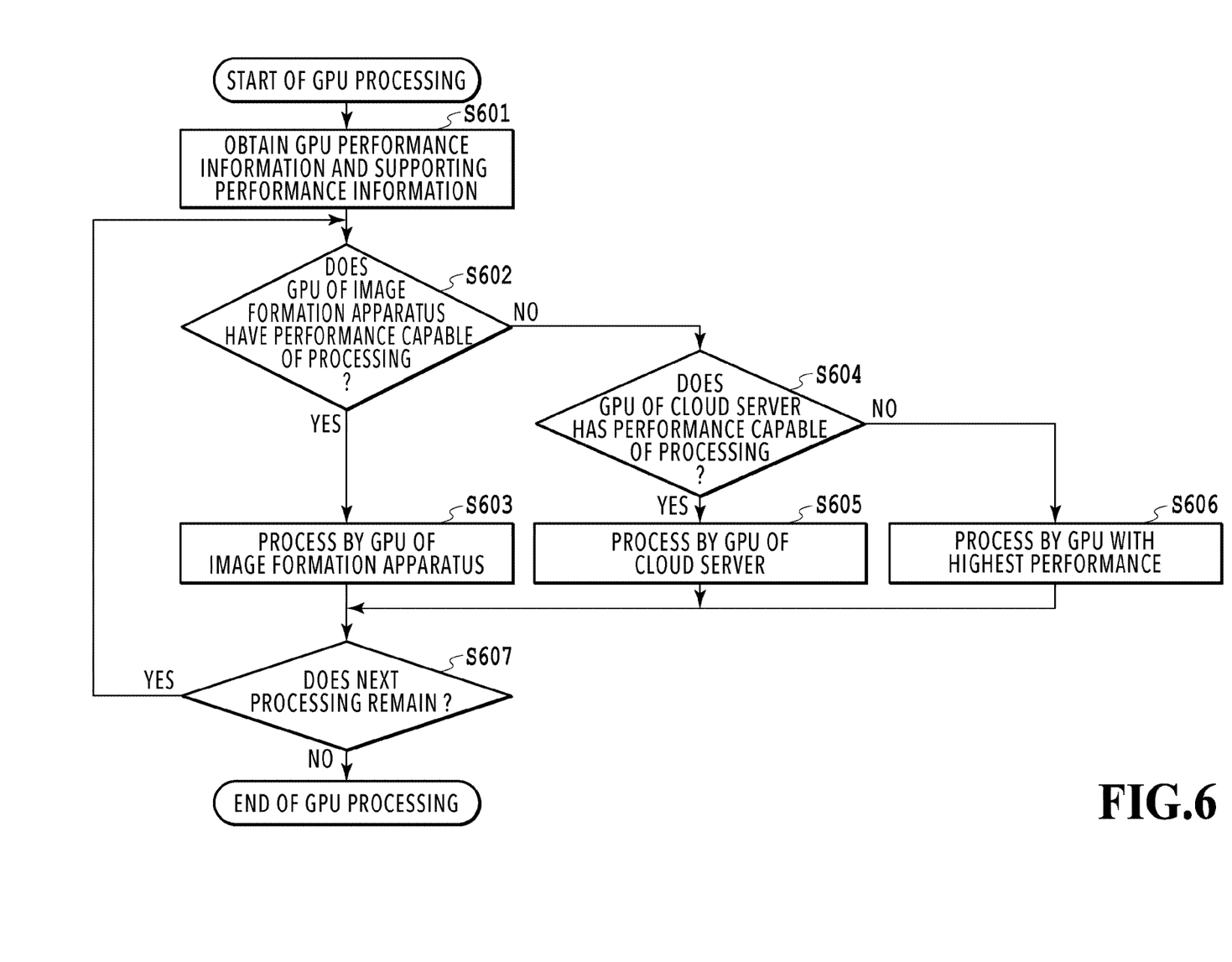
FIG. 6 is a flowchart of GPU allocation.

FIG. 6 is a flowchart of processing of determining a GPU executing predetermined processing in this embodiment. Hereinafter, a method of allocating a GPU to a device having proper GPU performance by the CPU 201 in predetermined GPU-using processing is described. The predetermined processing is processing using an engine of machine learning such as the learning or inference of image recognition and character recognition. Note that, the processing in each step in FIG. 6 is executed with the CPU 201 of the image formation apparatus 1 expanding a program code stored in the non-volatile memory 205 into the memory 203 and executing the program code. The sign "S" in the description of each processing means a step in the flowchart.

Once the predetermined GPU-using processing is inputted, the CPU 201 of the image formation apparatus 1 obtains the various information illustrated in FIG. 5 in S601. In other words, the CPU 201 obtains the GPU performance information 401a illustrated in FIG. 5A and the supporting performance information 402 illustrated in FIG. 5B. In this step, the CPU 201 may obtain the GPU performance information 401b on the cloud server 10 through the Internet. In S602, the CPU 201 determines whether the GPU 210 of the image formation apparatus 1 has the performance capable of processing. Specifically, in S602, the CPU 201 first determines the processing inputted into the image formation apparatus 1. The CPU 201 then refers to the supporting performance information 402 illustrated in FIG. 5B and identifies the GPU performance associated with the determined processing. The CPU 201 then refers to the GPU performance information 401a illustrated in FIG. 5A and checks the performance of the GPU 210 mounted in the image formation apparatus 1 to determine whether this inputted predetermined processing is processable by the GPU 210 in the image formation apparatus 1. In other words, the CPU 201 determines whether the GPU of the image formation apparatus 1 satisfies the identified GPU performance. If there is only one index of the performance required for the GPU-using processing, the determination is made by depending on whether the GPU 210 in the image formation apparatus 1 satisfies that index. On the other hand, if there are multiple indexes of the performance required for the GPU-using processing, the determination of whether it is processable is made by depending on whether the GPU 210 in the image formation apparatus 1 satisfies all the indexes. If the CPU 201 determines that it is processable by the GPU 210 in the image formation apparatus 1, the process proceeds to S603. On the other hand, if it is determined that the GPU 210 in the image formation apparatus 1 does not have the performance that satisfies the processing, the process proceeds to S604. If the image formation apparatus 1 has a configuration which does not include the GPU 210, the process proceeds to S604 as a result of the determination in S602.

In S603, the GPU 210 in the image formation apparatus 1 executes the predetermined processing inputted in S601. Thus, it is possible to reduce the processing executed by the cloud server 10 and reduce the load on the cloud server 10 by causing the image formation apparatus 1 to preferentially execute the processing that can be executed by the image formation apparatus 1. In S604, the CPU 201 obtains the GPU performance information 401b on the cloud server 10 through the Internet and determines whether it is processable with the GPU performance of the cloud server 10. The determination on whether it is processable with the GPU performance of the cloud server 10 may be performed as with the determination on whether it is processable by the GPU 210 of the image formation apparatus 1. In this process, if the GPU performance information 401b on the cloud server 10 is already obtained, it is unnecessary to obtain the GPU performance information 401b again.

If it is determined that the GPU of the cloud server 10 has the performance that satisfies the processing, the process proceeds to S605. In S605, the cloud server 10 executes the processing by the GPU 303. On the other hand, if it is determined that the GPU of the cloud server 10 does not have the performance that satisfies the processing, the process proceeds to S606.

In S606, the processing is executed by the GPU having the highest performance in the image formation apparatus 1 and cloud server 10. As the GPU having the highest performance, if there is only one index of the performance required for the GPU-using processing, the GPU with the highest of that index is selected, and if there are multiple indexes of the performance, the GPU with the comprehensively highest performance is selected. For example, as in the sub-process 1-1 in FIG. 5B, a "floating point performance parameter" obtained by multiplying the performance ratio of FP16 by the performance ratio of FP32 may be calculated to select the GPU with the highest value of the "floating point performance parameter".

In S607, the CPU 201 checks whether there remains next GPU-using processing, and the process returns to S602 if the processing remains. If no processing remains, the GPU processing is terminated. The determination of whether next processing remains may be made such that, like the subdivided processing 2 in FIG. 5B, it is determined that no processing remains because next processing (for example, a sub-process 3-1) does not exist after the sub-processing 2-2 is terminated. Then, for example, in the other case where there is next processing such as sub-processes 3-1, 3-2, and 3-3 following the sub-process 2-2 in FIG. 5B, it may be determined that the processing remains.

As described above, according to this embodiment, it is possible to reduce the load on a cloud server. Specifically, because it is possible to allocate predetermined GPU-using processing to the GPU 210 of the image formation apparatus 1 in accordance with the performance, it is possible to reduce the processing executed by only the cloud server 10 and eventually reduce the load on the cloud server 10. This solves also a reduction in the performance caused by the load on a cloud server. In the conventional GPU-using processing, all the data has been transmitted to a cloud server; however, as an image formation apparatus as an edge device also executes the processing, it is possible to achieve a reduction in the communication load.

OTHER EMBODIMENTS

In the embodiment 1, the predetermined processing is allocated to either the image formation apparatus 1 or the cloud server 10; however, the configuration is not limited thereto. It is possible to employ a mode in which the predetermined processing is subdivided into, for example, 10 stages, and the processing at the first to third stages is allocated to the image formation apparatus 1 while the processing of the remaining fourth to tenth stages that are more than half of the stages is allocated to the cloud server 10 in accordance with the performance of the GPUs in the two. With the above configuration, since the GPU 303 of the cloud server 10 can be used also in a case where the GPU performance of the image formation apparatus 1 is low while the data transmitted to the cloud server 10 is reduced, it is possible to secure the accuracy of the processing.

Additionally, in the embodiment 1, the GPU is described as an example of the processor executing processing; however, the configuration is not limited thereto. For example, a mode in which an edge device or a cloud server includes a processor dedicated to specific processing that is processing using parallel processing, and the edge device requests a device determined as capable of processing to execute the processing may be employed. Additionally, for example, the above-described processor dedicated to the specific processing may include a GPU and a CPU. That is, a mode in which a GPU and a CPU cooperate to execute the predetermined processing may be employed. Moreover, a mode in which, in the predetermined processing, most of the processing (for example, at least more than half of the processing) is executed by a GPU, and the rest of the processing is executed by a CPU may be employed. In this case, the GPU performance described in the embodiment 1 may be the performance in a case of executing the processing by a GPU only, or may be the performance in a case of executing the processing by cooperating GPU and CPU.

Furthermore, in the embodiment 1, a cloud server is described as an example of a server including a GPU;

however, the server is not limited to a cloud server. For example, a mode in which the server is locally connected to a LAN same as the one used for an edge device and a computer, and the edge device requests the server including a GPU to execute processing may be employed.

Additionally, the rendering of a UI screen as well as copying and image processing on PDL that are conventionally performed by the image processing ASIC do not fall into the predetermined processing described above and are processing mainly executed by a GPU in an edge device. For this reason, as for such processing, the flow of the GPU allocation as indicated in FIG. 6 is not executed, and the processing is completed by only an edge device.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital general-purpose disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-203294, filed Dec. 8, 2020, which is hereby incorporated by reference wherein in its entirety.

What is claimed is:

1. An edge device capable of requesting a server including a first processing processor dedicated to specific processing to execute predetermined processing, comprising:
   a determination unit configured to determine whether the predetermined processing is processable by a second processing processor included in the edge device and dedicated to the specific processing; and
   a control unit configured to cause the second processing processor of the edge device to execute the predetermined processing in a case where it is determined that the predetermined processing is processable,
   wherein the determination unit refers to performance information on the second processing processor and makes the determination by depending on whether the second processing processor satisfies performance supporting the predetermined processing,
   wherein in a case where it is determined that the predetermined processing is not processable by the second processing processor included in the edge device, the determination unit determines whether the predetermined processing is processable by the first processing processor included in the server, and
   wherein in a case where it is determined that the predetermined processing is processable by the first processing processor, the control unit causes the server to execute the processing.

2. The edge device according to claim 1, wherein the determination unit refers to performance information on the first processing processor and determines whether the predetermined processing is processable by the first processing processor depending on whether the first processing processor satisfies the performance supporting the predetermined processing.

3. The edge device according to claim 1, wherein the edge device subdivides the predetermined processing into sub-processes and causes one of the edge device and the server to execute each of the sub-processes.

4. The edge device according to claim 1, wherein the first processing processor and the second processing processor are graphics processing units (GPUs).

5. The edge device according to claim 1, wherein the second processing processor of the edge device includes a graphics processing unit (GPU) and a CPU.

6. The edge device according to claim 1, wherein the first processing processor of the server includes a graphics processing unit (GPU) and a CPU.

7. The edge device according to claim 1, wherein the predetermined processing is at least one of rendering of a user inteface screen, real-time digital image processing, and learning or inference of image recognition and character recognition.

8. The edge device according to claim 1, wherein the server is a cloud server connected to the edge device through the Internet.

9. The edge device according to claim 1, wherein the edge device is an image formation apparatus.

10. The edge device according to claim 1, wherein the specific processing is processing using parallel processing.

11. An edge device capable of requesting a server including a first processing processor dedicated to specific processing to execute predetermined processing, comprising:
    a determination unit configured to determine whether the predetermined processing is processable by a second processing processor included in the edge device and dedicated to the specific processing; and
    a control unit configured to cause the second processing processor of the edge device to execute the predetermined processing in a case where it is determined that the predetermined processing is processable,
    wherein, in a case where the determination unit determines that the predetermined processing is processable by neither of the second processing processor included in the edge device and the first processing processor included in the server, the control unit causes one of the first and second processing processors that includes a processing processor with higher performance to execute the predetermined processing.

12. An edge device capable of requesting a server including a first processing processor dedicated to specific processing to execute predetermined processing, comprising:

a determination unit configured to determine whether the predetermined processing is processable by a second processing processor included in the edge device and dedicated to the specific processing; and a control unit configured to cause the second processing processor of the edge device to execute the predetermined processing in a case where it is determined that the predetermined processing is processable, wherein the edge device is an image formation apparatus, wherein the image formation apparatus includes at least one of a printing unit and a reading unit, and wherein the second processing processor is a processor different from an image processing processor to be used in image processing by the printing unit or the reading unit.

13. A non-transitory computer-readable storage medium storing a program for causing a computer to function as edge device, wherein the edge device is capable of requesting a server including a first processing processor dedicated to specific processing to execute predetermined processing and is configured to function as a determination unit configured to determine whether the predetermined processing is processable by a second processing processor included in the edge device and dedicated to the specific processing, and a control unit configured to cause the second processing processor of the edge device to execute the predetermined processing in a case where it is determined that the predetermined processing is processable, wherein the determination unit refers to performance information on the second processing processor and makes the determination by depending on whether the second processing processor satisfies performance supporting the predetermined processing, wherein in a case where it is determined that the predetermined processing is not processable by the second processing processor included in the edge device, the determination unit determines whether the predetermined processing is processable by the first processing processor included in the server, and wherein in a case where it is determined that the predetermined processing is processable by the first processing processor, the control unit causes the server to execute the processing.

14. A method of controlling an edge device capable of requesting a server including a first processing processor dedicated to specific processing to execute predetermined processing, comprising:

determining whether the predetermined processing is processable by a second processing processor included in the edge device and dedicated to the specific processing; and performing control to cause the second processing processor of the edge device to execute the predetermined processing in a case where it is determined that the predetermined processing is processable, wherein the determining is performed with reference to performance information on the second processing processor and based on whether the second processing processor satisfies performance supporting the predetermined processing, wherein in the determining, in a case where it is determined that the predetermined processing is not processable by the second processing processor included in the edge device, it is determined whether the predetermined processing is processable by the first processing processor included in the server, and wherein in a case where it is determined that the predetermined processing is processable by the first processing processor, the control unit causes the server to execute the processing.

* * * * *